(No Model.)
F. E. TARVER.
COTTON PLANTER.
No. 283,682. Patented Aug. 21, 1883.
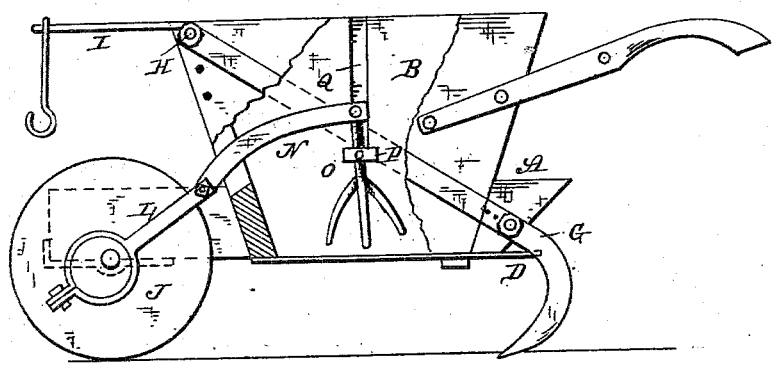
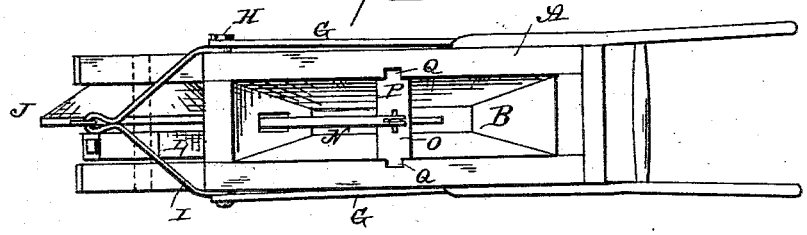
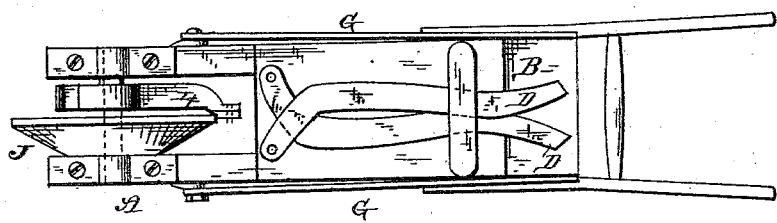
Witnesses:
Louis F. Gardner
J. W. Garner
Inventor:
F. E. Tarver
per
F. A. Lehmann,
atty

UNITED STATES PATENT OFFICE.

FLEMING ELIPHELET TARVER, OF HEPHZIBAH, GEORGIA.

COTTON-PLANTER.

SPECIFICATION forming part of Letters Patent No. 283,682, dated August 21, 1883.

Application filed April 11, 1883. (No model.)

*To all whom it may concern:*

Be it known that I, F. E. TARVER, of Hephzibah, in the county of Richmond and State of Georgia, have invented certain new and useful Improvements in Cotton-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-planters; and it consists in the combination of a seed-box having a slot through its bottom, a driving-wheel having an eccentric formed upon its hub or shaft, a connecting-rod, an operating-lever, and a stirrer, which is made screw-threaded and passed through a suitable support, which is placed in grooves or bearings formed for it in the inner side of the seed-box, as will be more fully described hereinafter.

The object of my invention is to provide a cotton-seed planter in which the stirring device can be made adjustable vertically for the purpose of regulating the distance it shall extend downward through the slot in the bottom.

Figure 1 is a side elevation of my invention with portion of the side of the hopper removed. Fig. 2 is a plan view of the same. Fig. 3 is an inverted view of the machine.

A represents the frame of the machine, and B the hopper which is connected thereto, which hopper has a suitable slot made through its bottom in the usual manner. In order to regulate the amount of seed that shall be dropped as the machine moves along, there is pivoted to the under side of the frame and upon each side of the slot a slide or lever, D, which cross each other at their front ends, and which are so shaped that they can be moved toward each other at their inner edges, and thus entirely cut off the amount of seed that is allowed to drop through them, or to regulate the amount at the will of the operator. The rear ends of these levers or cut-offs project beyond the rear end of the frame, where they are easily reached by the operator, who walks behind the machine. Secured at the rear end of the frame, upon a suitable clamping-bolt, are the two beams C, which have their front ends extended diagonally upward, as shown. Through the upper end of the beams and the front upper end of the seed-box is passed the clamping-bolt H, to which bolt is also fastened the clevis I, or other suitable device, to which the draft animal is attached. There will be two or more holes through the front of the hopper for the purpose of raising or lowering the draft adjustment, as may be desired. These beams, being attached both at the rear end of the frame and at the upper front end of the planter, form rigid braces for strengthening the whole machine. The front end of the frame is supported upon the wheel J, which serves to open the furrow as the machine is drawn along, and which has either an eccentric formed upon its side or upon its shaft for the purpose of operating the connecting-rod L. The inner end of this connecting-rod is fastened to the lever N, which is pivoted at its rear end to the upper end of the stirring device O. This stirring device O is made screw-threaded at its upper end, and is passed through the bearing P, which is dropped into suitable grooves Q, formed upon the inner side of the box. These grooves, of course, may be lined with iron, so as to protect the wood from wear. The support through which the stirrer passes is made to rock back and forth upon its pivots, and as it rocks the stirrer is moved back and forth over the slot through the bottom of the hopper, and thus made to force the cotton-seed through the slot into the furrow which has been formed by the wheel. This stirrer is made screw-threaded, so that it can be adjusted directly in its support, and thus the amount of seed which it is made to force through the slot can be regulated at the will of the operator. This is a very desirable feature, and used in connection with the cut-offs or levers pivoted on the under side of the frame, the operator is enabled to control accurately the amount of seed that is being planted. When it is desired to adjust the stirrer device up or down, it is only necessary to pull upward upon the stirrer, when its supporting device will be raised out of its grooves, and then it can be moved around one or more times upon the screw-threaded portion of the stirrer to raise the stirrer upward or drop it farther downward, as may be preferred. This adjustment allows the stirring advice to be adjusted at will without having to disconnect a single part.

Having thus described my invention, I claim—

1. The combination of the hopper B, provided with the grooves Q upon its inner sides, the supporting-piece P, which has its ends to catch in the grooves, the vertically-adjustable stirring device which passes down through the support P, the connecting-rod N, the operating rod or lever L, and the eccentric formed upon the operating-shaft, whereby as the machine is moved forward the stirring device is made to reciprocate, substantially as shown.

2. The combination of the frame A, the hopper, the beams, the clamping-bolt, which is passed through their front ends, and the draft attachment, the beams being made to extend diagonally upward upon the outer side of the seed-box, for the purpose of bracing the machine, substantially as set forth.

In testimony whereof I affix my signature in presence of two witnesses.

FLEMING ELIPHELET TARVER.

Witnesses:
ROBERSON SNOW,
WALTER N. CLARK.